United States Patent [19]

McNeil et al.

[11] Patent Number: 4,815,820
[45] Date of Patent: Mar. 28, 1989

[54] METHOD AND APPARATUS FOR ALIGNING A DIFFRACTION GRATING FOR TUNING THE OUTPUT OF A LASER

[75] Inventors: John A. McNeil, Los Angeles; Robin A. Reeder, Arleta, both of Calif.

[73] Assignee: Hughes Aircraft Company, Los Angeles, Calif.

[21] Appl. No.: 860,930

[22] Filed: May 8, 1986

[51] Int. Cl.[4] .......................... G02B 27/44; G01J 3/18; H01S 3/10
[52] U.S. Cl. ........................... 350/162.17; 350/162.23; 350/320; 356/334; 372/20
[58] Field of Search ................. 350/162.17, 162.23, 350/320, 162.11, 636; 372/20; 356/334

[56] References Cited

U.S. PATENT DOCUMENTS

| Re. 27,653 | 5/1973 | Oskam | 350/636 |
| 3,775,010 | 11/1973 | Chupp et al. | 356/334 X |
| 4,639,081 | 1/1987 | O'Brien | 350/636 X |

FOREIGN PATENT DOCUMENTS

| 533992 | 10/1976 | U.S.S.R. | 350/162.17 |
| 2129201A | 5/1984 | United Kingdom | 372/20 |

OTHER PUBLICATIONS (S16310012) Bergström, G., et al., "A Fast Method for Calibrating Cosecant Drive Monochromators", *Journal of Roman Spectroscopy*, vol. 9, No. 6, Dec. 1980, pp. 403-406.
(S01980039) Aspnes, D. et al., "Geometrically Exact Monochromator Alignment", *Rev. Sci. Instrum*, vol. 41, No. 7, Jul. 1970, pp. 966-968.
(S86960037G) Hallgren, R. "Application of a Holographically Recorded Concave Diffraction Grating in a Single—Beam Spectrophotometer", *American Laboratory*, vol. 9, No. 11, Nov. 1977, pp. 69-75.

*Primary Examiner*—John K. Corbin
*Assistant Examiner*—David J. Edmondson
*Attorney, Agent, or Firm*—Ronald L. Taylor; William J. Streeter; A. W. Karambelas

[57] ABSTRACT

A method and improved apparatus for aligning a diffraction grating, as, for example, one used in tuning the output of a laser. The total angular misalignment $\epsilon$ between the incident and diffracted beams is a function of three angles: the tuning angle $\theta 16$, the angle of tilt $\beta$ between the plane of the grating 15 and the tuning rotational axis, and the angle $\alpha$ between the grating lines and the projection of the turning rotational axis in the plane of the grating 15. The present invention provides a method of aligning the diffraction grating so that the residual alignment error is very small over the desired range of tuning angle $\theta$ 16, by adjusting only $\alpha$ or only $\beta$ to zero at two reference tuning angles $\theta_0$ and $\theta_1$. Knowledge of the value of either $\alpha$ or $\beta$ is not necessary. For a $CO_2$ laser tuned over the wavelength range 9.11 to 10.88 μm, calculations show that the present method grating alignment results in a residual angular misalignment error $\epsilon$ of less than 60 μrads, when $\alpha$ is close to 12,000 μrads and $\beta$ is equal to 10,000 μrads. Since adjustment of only $\alpha$ or $\beta$ is necessary in minimizing the total misalignment, an improved apparatus for aligning diffraction gratings consists of providing means for adjusting only one of the two angles $\alpha$ and $\beta$ in addition to the tuning angle $\theta$.

20 Claims, 4 Drawing Sheets

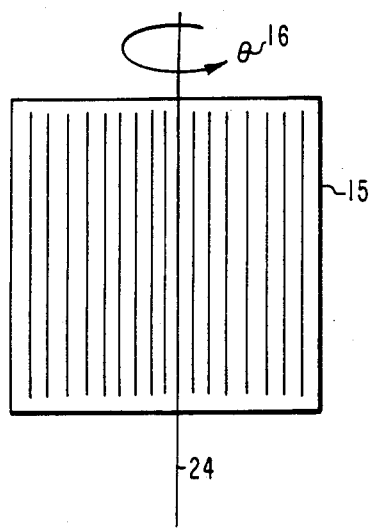
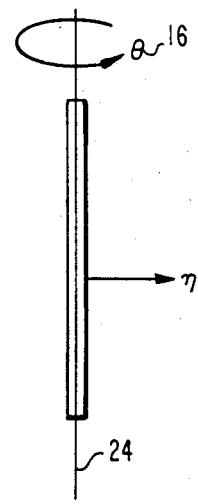
Fig. 1a.
Fig. 1b.
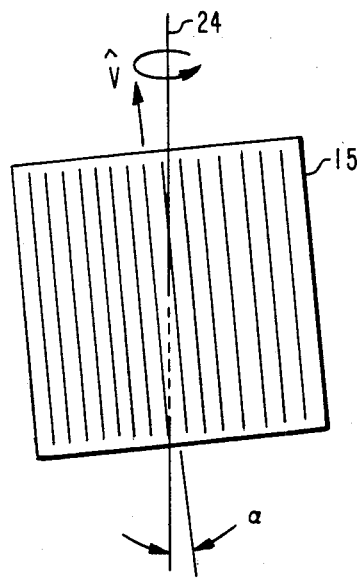
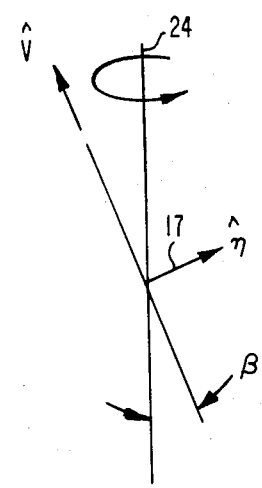
Fig. 2a.
Fig. 2b.

Fig. 4.
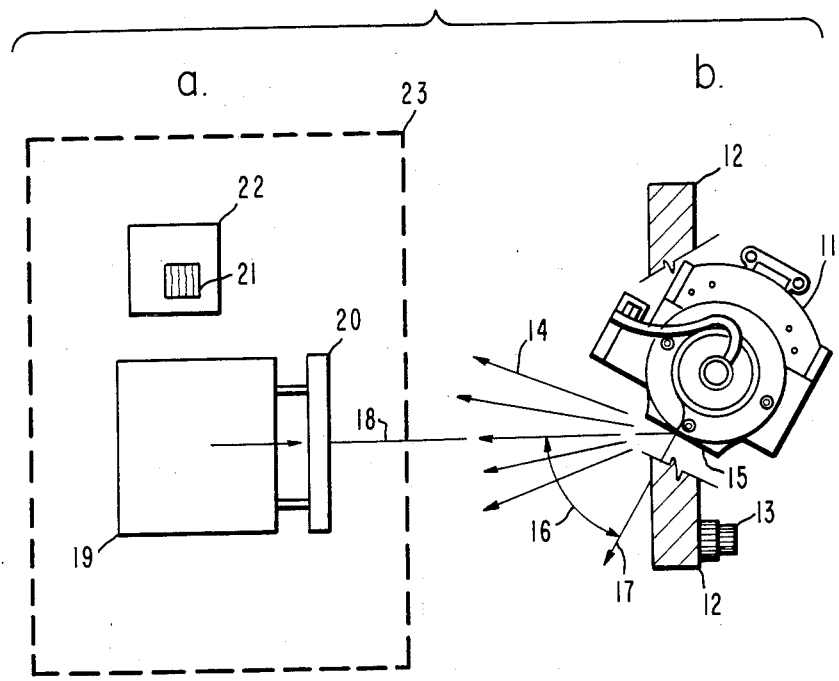
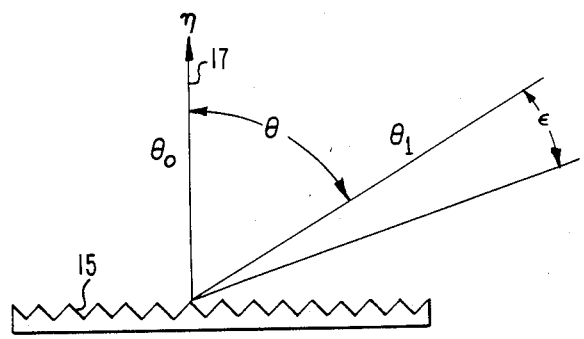
Fig. 3.

METHOD AND APPARATUS FOR ALIGNING A DIFFRACTION GRATING FOR TUNING THE OUTPUT OF A LASER

BACKGROUND OF THE INVENTION

1. Field of the Invention

The present invention relates to methods and apparatus for lasers and laser resonating cavities, and in particular to methods and apparatus involving the use of a diffraction grating to tune the output of a laser.

2. Description of the Technology

Any periodic arrangement of diffracting bodies can be referred to as a diffraction grating, but in practice gratings usually consist of equidistant rulings made by diamond on a plate or mirror, or a replica of such a ruled grating. Many of the important properties of diffraction gratings are associated with the interference effects between disturbances from corresponding parts of the separate elements. That is to say, they depend more on the periodicity of the diffracting elements than on the shape of the individual elements.

If the elements of a grating are narrow slits, they act as sources of disturbances which, since they are narrow, radiate uniformly. When the elements of the grating are not narrow slits they can still be regarded as sources but they do not radiate uniformly, and the result is that diffracted light intensity peaks of almost exactly the same shape are formed in the same parts of the pattern as before, but with different relative intensities.

A typical diffraction grating, then, is an optical element consisting of a very large number of closely and uniformly spaced grooves ruled on some sort of substrate. In the case of a reflection grating, the grating surface is coated with a reflecting metal so that parallel monochromatic light incident on the grating is diffracted from the grating surface to produce an intensity pattern which depends on the angle at which the grating is viewed. Roughly speaking there are intensity peaks at given angular intervals which arise from the constructive interference of light wavelets emanating from the regularly spaced reflecting elements. The "order" of the diffracting peak depends on the phase difference between the successively scattered wavelets that combine to produce the total light intensity at a given angle. In general the larger the phase difference (in multiples of $2\pi/\lambda$ where $\lambda$ is the wavelength), the weaker the diffracted peak. A so-called "blazed grating" utilizes reflections from a regular array of angled surfaces, and has the advantage that the predetermined groove form concentrates most of the diffracted light within a narrow range of directions.

Diffraction gratings when used with monochromatic light are useful for changing the direction of a beam. In particular, if the light is diffracted back on itself, a diffraction grating can serve as a retroreflective element. However, as in the case of a retroreflecting mirror or prism, a retroreflecting diffraction grating must be aligned; the parallel grating lines have to be perpendicular to the optical axis of the apparatus of which the grating is a part. If a blazed grating is used in tuning to spectral lines having different wavelengths, the grating lines must in addition be parallel to the axis of rotation that determines which spectral line is selected.

FIGS. 1 and 2 show a diffraction grating 15 mounted on an axis of rotation 24 for purposes of tuning the wavelength of the light diffracted in a particular direction (as in a spectral line selector in a laser resonator). There are three degrees of freedom of alignment:

(1) the tuning angle of rotation, $\theta$ 16, (2) the angle $\alpha$ in the plane of the grating 15 between the grating lines and the projection of tuning axis of rotation 24, as shown in FIG. 2a, and (3) the tilt angle $\beta$ between the tuning axis of rotation 24 and the plane of the grating 15, as shown in FIG. 2b. (If the grating is a concave grating the angles $\theta$, $\alpha$, and $\beta$ can be suitably redefined.)

An important case is the one in which the diffracted light travels back along the path of the incident beam (the so-called Littrow condition). For this case an analysis of the problem yields (to first order in $\alpha$ and $\beta$) the following equation for the alignment error of the diffracted light when the tuning angle is changed to select a different wavelength:

$$\epsilon = 2\alpha(\sin\theta - \sin\theta_0) + 2\beta(\cos\theta - \cos\theta_0), \quad (1)$$

where $\epsilon$ is the total alignment error of the diffracted light (as shown in FIG. 3), $\theta_0$ is the tuning angle at a reference wavelength where the system is correctly aligned, $\theta$ 16 is the tuning angle for a desired wavelength, $\alpha$ is the alignment angle in the plane of the grating 15 between the grating lines and the projection of the tuning axis of rotation on the plane of the grating 15 (see FIG. 2a), and $\beta$ is the tilt angle between the plane of the grating 15 and the tuning axis of rotation 24 (see FIG. 2b).

Previous apparatus and methods of grating alignment require stringent machining and assembly tolerances with respect to adjustments for the two angles of alignment of the grating 15 to the axis of tuning rotation 24. The usual method of grating alignment consists of aligning the system as a whole at one reference wavelength and then trusting that the angles $\alpha$ and $\beta$ are sufficiently small that the diffracted light error angle $\epsilon$ will not become unacceptably large as the grating 15 is tuned to other wavelengths.

The approach of providing adjustments for both $\alpha$ and $\beta$ and developing an alignment procedure to reduce them to sufficiently small values has serious problems associated with it. There is no easy way of measuring either $\alpha$ or $\beta$. Even if there were convenient ways of measuring $\alpha$ and $\beta$, such an approach would require adjustments for both angles.

There has been a long felt but unsatisfied need for the design and construction of lasers whose output wavelength can be tuned rapidly and accurately to particular spectral lines. Tunable $CO_2$ lasers, for example, will become more important in the future, especially as sources for remote sensing spectrometers for chemical detection. Remote detection of specific types of chemical contamination will certainly find many uses.

SUMMARY OF THE INVENTION

The present Hughes invention solves the problem of providing accurate, fast alignment of a diffraction grating utilized in tuning the output of a laser to a particular wavelength. Line selection in a tunable laser (a $CO_2$ laser, for example) can be accomplished by mounting the diffraction grating 15 on a tuning axis 24 (as in FIG. 1) and rotating the grating to the desired angle $\theta$ 16. There are three mechanical alignments to consider:

(1) The tuning axis 24 may be laterally displaced from the surface of the grating 15. This has no effect on the angles between the laser axis and the grating lines, and therefore introduces no misalignments.

(2) The grating 15 may be turned in its own plane (through the angle $\alpha$ shown in FIG. 2a) so that the grooves are not parallel to the tuning axis of rotation 24. When the grating 15 is rotated about the axis 24, the grooves will no longer be perpendicular to the optical axis of the laser, with the consequence that the angle $\epsilon$ between the incident and diffracted beams may no longer be zero.

(3) The tuning axis of rotation 24 may be tilted (by the angle $\beta$ shown in FIG. 2b) so that it is not parallel to the grating surface. This may be due to the nonparallelism of the front (grating) and back (mounting) surfaces of the grating substrate, or to "wandering" of the tuning axis of rotation 24 due to flexure mounts or bearing runout. In either case, when the grating 15 is rotated about the tuning axis 24 the grooves will no longer be perpendicular to the laser optical axis, with the consequence that the angle $\epsilon$ between the incident and diffracted beams may no longer be zero.

Previous methods of alignment for a laser system tuned with a grating necessitate alignment of the system at one reference wavelength and require that the grating alignment angles $\alpha$ and $\beta$ be small so that the net alignment error does not grow too large as the grating is tuned. The present invention requires that there be an adjustment for either one or the other of the two grating alignment angles $\alpha$ and $\beta$, but does not require a knowledge of what value either angle has. One of the principle features of the present invention is that in Equation (1) for the error angle of the diffracted light, if one were to select $\alpha$ for a given $\beta$ such that $$\alpha = -\beta(\cos\theta_1 - \cos\theta_0)/(\sin\theta_1 - \sin\theta_0) \quad (2)$$

then $\epsilon = 0$ at both $\theta_1$ and $\theta_0$. Furthermore, if the angles $\theta_1$ and $\theta_0$ are both in the neighborhood of 45°, then $\epsilon$ is approximately equal to zero for all angles in that neighborhood. Similarly, one can choose $\beta$ for a given $\alpha$ in the above procedure if $\beta$ is the angle selected for alignment purposes.

Therefore, it is an object of the present invention to provide fast, accurate alignment of a diffraction grating utilized in tuning the output of a laser over a range of wavelengths.

It is a further object of the present invention to provide for a method of alignment of a diffraction grating in tuning a laser that requires adjustment of only one angular degree of freedom (other than the tuning angle) by using one angular degree of freedom which is readily controllable to exactly compensate the effects of another degree of freedom which is not readily controllable.

It is yet another object of the present invention to provide a method of drastically reducing the alignment errors of light diffracted from a tunable diffraction grating without requiring stringent machining and assembly tolerances on the alignment of the grating to the tuning rotation axis.

It is still another object of the present invention to provide a method of alignment of a diffraction grating utilized in tuning the output of a laser in which it is not necessary to know what the values of the angles $\alpha$ and $\beta$ are, since only the net misalignment of the diffracted light is observed and made use of.

Additionally, it is an object of the present invention to provide a method for alignment of a diffraction grating utilized in tuning the output of a laser which is able to correct for systematic variation of one of the angles $\alpha$ or $\beta$ with rotation about the tuning axis.

Finally, it is an object of the present invention to allow rapid tuning of a laser by means of a grating from one output wavelength to another within a range of wavelengths such that the alignment error over the entire range of wavelengths remains acceptably small without need for any further adjustment.

An appreciation of other aims and objects of the present invention and a more complete and comprehensive understanding of this invention may be achieved by studying the following description of a preferred embodiment and by referring to the accompanying drawings.

BRIEF DESCRIPTION OF THE DRAWINGS

FIG. 1 is a drawing of a diffraction grating showing (a) a front view and (b) a side view, with an axis of rotation enabling rotation through an angle $\theta$. A unit normal vector $\hat{n}$ perpendicular to the plane of the grating is shown in the side view.

FIG. 2 illustrates the same diffraction grating shown in FIG. 1 with details of possible misalignment of the grating. FIG. 2a shows the lines of the grating making an angle $\alpha$ with the tuning axis of rotation. FIG. 2b shows a tilt of the grating through an angle $\beta$ with respect to the tuning axis of rotation. In both FIGS. 2a and 2b a unit vector $\hat{v}$ parallel to the lines of the grating is shown.

FIG. 3 illustrates the angular discrepancy $\epsilon$ between the input and first-order diffracted light beams due to misalignment of a grating satisfying the Littrow condition.

FIG. 4 is a schematic diagram illustrating the present method of aligning a diffraction grating used to tune the output wavelength of a laser system. The mount allowing solid body orientation of the agile grating mechanism is shown in cross section; the mount and the agile grating mechanism are mechanically connected.

DESCRIPTION OF A PREFERRED EMBODIMENT

Figure 5:
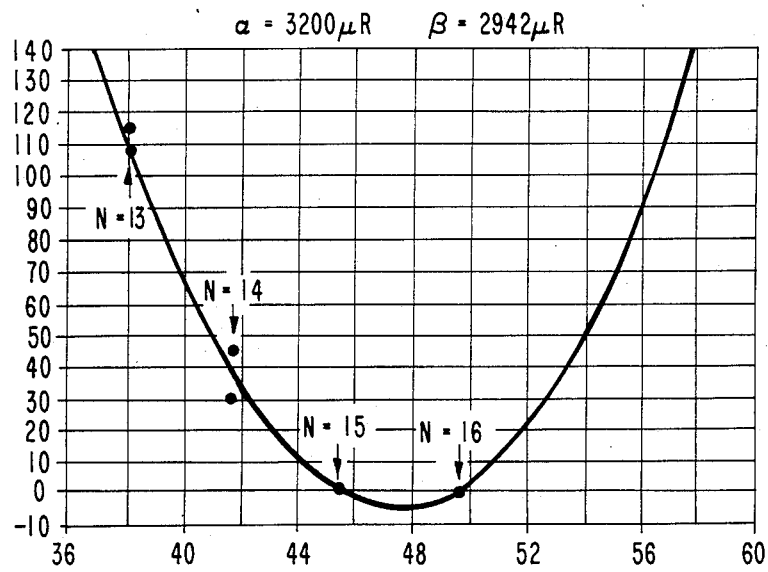
FIG. 5 shows experimental results of measured misalignment over a range of tuning rotation angles using the method of the present invention. The ordinate of the graph represents the misalignment error angle $\epsilon$ in $\mu$rads, and the abcissa represents the rotation angle $\theta$ in degrees.
Figure 6:
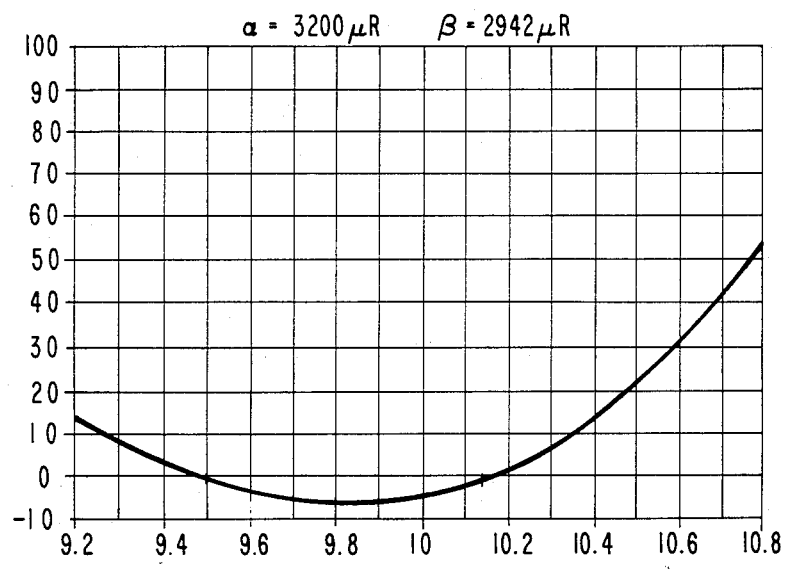
FIG. 6 shows experimental results of measured misalignment over a range of wavelengths using the method of the present invention. The ordinate represents the misalignment error $\epsilon$ in $\mu$rads, and the abcissa represents the wavelength in $\mu$meters.
Figure 7:
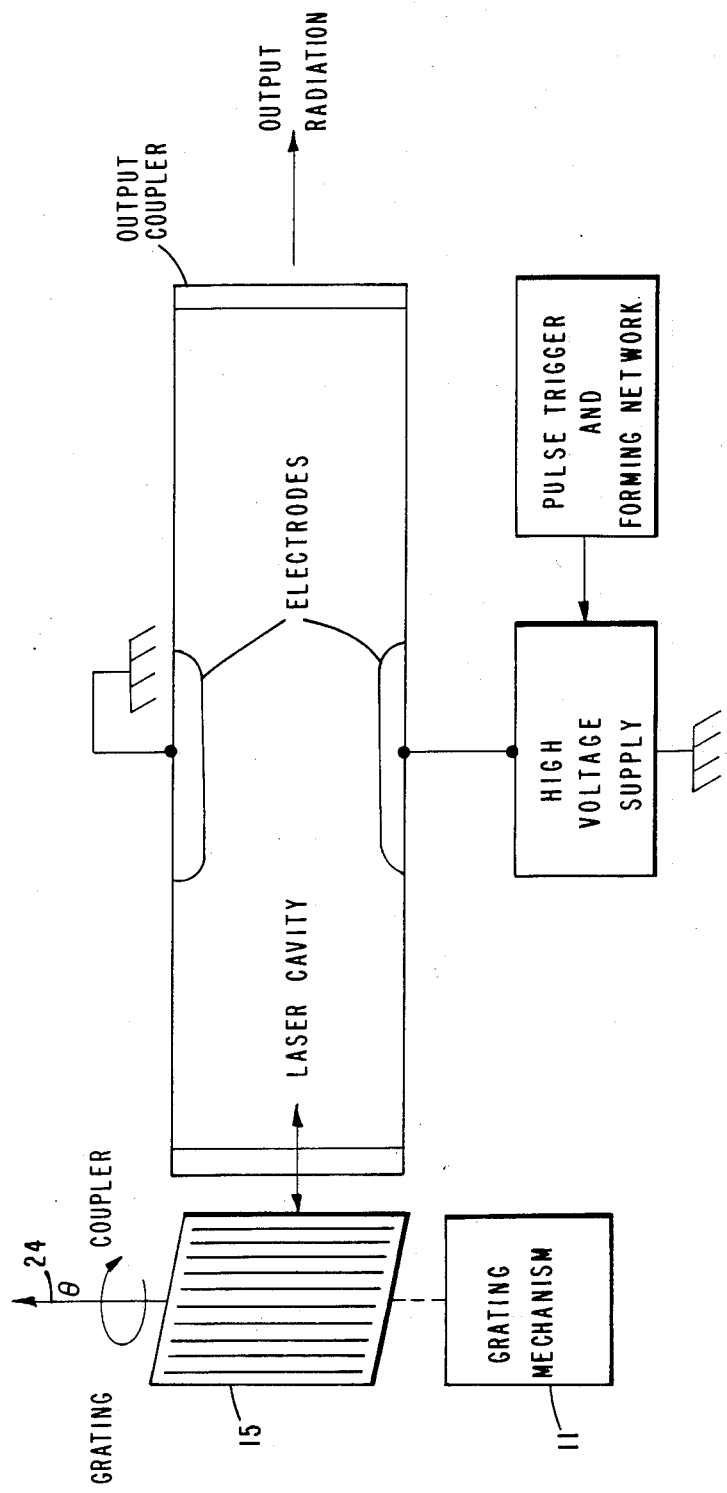
FIG. 7 shows a simplified block diagram of a laser resonator cavity having a rotatable diffraction grating adjacent to one end thereof, the grating having been aligned in accordance with a method of the invention.

Referring to FIG. 4, the various components of a preferred arrangement used to align a diffraction grating to be used for tuning the output wavelength of a laser system can be seen. An agile grating mechanism 11 is electronically steerable in the tuning angle $\theta$. A mount 12 (shown in cross section) provides the possibility of solid-body orientation of agile grating mechanism 11 by means of two-axis alignment controls 13. One suitable mount 12 has been found to be a model AOM-110-4I Gimble mount manufactured by Aero Tech Corporation of Pittsburg, PA. Diffracted beams 14 of different diffraction orders are reflected by the grating surface 15. The tuning angle $\theta$ is the angle 16 between the incident beam 18 and the normal vector 17 which is perpendicular to the surface of the diffraction grating 15. The He-Ne laser beam 18 having wavelength 0.6328 μm and defining the optical axis of the overall setup emanates from a interferometer mainframe 19, passing through the interferometer output transmission reference flat 20. Observed interference fringes 21 are displayed on a video monitor 22 which is part of the interferometer system 23. One suitable interferometer system 23 has been found to be a model VC-2-01 Interferometer manufactured by Zygo Corporation of Middlefield, CT, which may be referred to herein as a "Zygo" or a "Zygo interferometer".

From the grating equation $$d(\sin\theta + \sin\phi) = n\lambda, \quad (3)$$

where $\theta$ and $\phi$ are the angles of the incident and diffracted beams, respectively, it is found that for the Littrow condition, in which the incident beam is diffracted through 180° (i.e., $\theta = \phi$), the tuning angle is given by $$\theta = \sin^{-1}(n\lambda/2d), \quad (4)$$

where n is the order of the diffraction, $\lambda$ is the wavelength, and d is the grating spacing. For a grating with a spacing of 150 lines/mm, TABLE 1 shows the comparison of first-order wavelengths with higher HeNe diffraction orders, with the appropriate tuning angles for the various lines. The 15th, 16th and 17th HeNe orders were chosen because they fall within the $CO_2$ operating range of about 9.2 to 10.8 μm.

TABLE 1

HeNe Littrow Angles and Their Equivalent First-Order Wavelengths

| HeNe Order | Tuning Angle in degrees | Equivalent First Order Wavelength in μm |
|---|---|---|
| 15 | 45.39 | 9.492 |
| 16 | 49.41 | 10.125 |
| 17 | 53.79 | 10.758 |

From the error equation (Equation (1)) it can be seen that there are two values of the tuning angle for which the alignment error can be made zero:

(1) at $\theta = \theta_0$, which is achieved by adjusting the output coupling element of the laser system relative to the grating for perfect alignment at this position. In fact this is a relative adjustment, so that either the entire grating mechanism can be left fixed and the entire output coupler moved for alignment, or equivalently the output coupler can be left fixed and the entire grating mechanism can be moved for alignment. Again referring to FIG. 4, in practice alignment is determined by observing fringes 21 on the video monitor 22 of a Zypo interferometer system 23, in which the output transmission reference flat 20 serves the same function (for purposes of alignment) as the output coupling element of a laser optical resonating cavity. Although there are alignment adjustments on the output transmission reference flat 20, the field of view of the interferometer used is rather restricted, so that preferably the equivalent operation of moving the grating mechanism as a whole is performed. The output transmission reference flat 20 of the Zygo interferometer system 23 remains fixed in position and the entire grating mechanism 11 is adjusted as a solid body for alignment. This is done using the 15th diffracted order of HeNe.

(2) at $\theta = \theta_1$, if the angle $\alpha$ is adjusted such that it has the value given by the right-hand side of Equation (2). This is done by changing the tuning angle until the 16th diffracted order of HeNe is observed. In general the system is not aligned at this point and interference fringes 21 will be observed on the video monitor 22. Without moving the grating mechanism as a solid body, the diffraction grating surface 15 is carefully rotated through the angle alpha.

The two adjustments mentioned above, i.e., the solid-body motion at $\theta_0$ using the 15th order of HeNe and the motion of the grating surface through $\alpha$ at the 16th order, are coupled and cannot be done independently. Therefore, the alignment procedure of the present invention is carried out as follows:

AGILE GRATING ALIGNMENT

Consider a grating 15 attached to an agile grating mechanism 11 which will rotate the grating about its wavelength-selecting axis 24 ($\theta$ rotation). For the purposes of this discussion, the grating 15 can be rotated about its normal 17 ($\alpha$ rotation), but it may have a nonadjustable tilt (angle $\beta$) with respect to its wavelength-selecting axis 24. Since the angles $\alpha$ and $\beta$ have random values, if the grating 15 were aligned in a resonator for a given wavelength and then scanned to a different wavelength, the resonator would be grossly misaligned at the new wavelength. The object of the present method is to adjust $\alpha$ so that the resonator will retain its alignment when tuned over a range of wavelengths.

The grating mechanism 11 is placed on a two-axis angular adjustment mount 12 and placed in the beam 18 from a Zygo interferometer 23. A Zygo interferometer is used for the purposes of this discussion because of its convenient modes of operation, but of course any interferometer with comparable characteristics can be used. In addition to the usual interferometer mode there is a "dot mode" in which the angular position of the reference and test flats is displayed as a dot on the monitor screen 22. This greatly simplifies the alignment of the test to the reference flat and also makes visible the relatively large adjustments that will be made to the angle $\alpha$. The two-axis angular mount 12 is necessary to realign the grating to the reference flat after $\alpha$ is changed. The angle $\alpha$ is changed in a systematic manner which leads to quick convergence to the condition where alignment is preserved as the wavelength is scanned by rotation through $\theta$.

The grating assembly is to be adjusted so that alignment is retained at two wavelengths. For a 150-line/mm grating, the 15th and 16th orders of HeNe (0.6328 μm) fall conveniently within the $CO_2$ laser operating range and will be used for the grating assembly alignment. The interferometer reference flat is the equivalent of the resonator outcoupler. If the 16th order is aligned to the reference flat (no interference fringes) and then the grating is scanned (rotated in tuning angle) until the 15th order is observed, the interferometer will show whether the 15th order is also aligned. If the 15th order is also nulled out, then the alignment is completed. It should be noted that the interferometer fringes produced by rotation about the tuning axis are unimportant and should be adjusted out.

Initial rough alignment of $\alpha$ is made so that the 15th and 16th orders are aligned to nearly the same angle by using the Zygo "dot mode." Fine alignment is then accomplished by observing the relative alignment of the 15th and 16th orders in the interferogram mode of operation. If the alignment is different, then α must be adjusted. The amount of adjustment of α is large compared to the misalignment between the 15th and 16th orders. Thus, α is best adjusted when the Zygo is in the dot mode. An angle change in the dot mode will correspond directly to an alignment change between the two HeNe orders. Once this indication of the magnitude of the alignment change is noted, alignment of the grating proceeds quickly. The positive or negative sense of of the grating misalignment can be easily determined by touching the grating mount and observing which way the interferometer fringes move.

Once alignment is completed, the adjustment for the angle α is locked and is not changed again. The grating assembly can then be used in a resonator, which is aligned in the standard way. Alignment will be retained for a wide range of wavelengths.

EXAMPLE

Consider a $CO_2$ laser with a 150-line/mm diffraction grating to select the output line of the laser over a wavelength region from 9.2 to 10.8 μm. Without the present invention, both misalignment angles α and β must be held to tight tolerances to keep the alignment error of the diffracted light sufficiently small. Previous methods would have proceeded as follows:

There is no spectral line available in the middle of the desired spectral range; about the closest usable line to the center is one at 10.1 μm. If the laser is aligned at 10.1 μm, Equation (1) above for the misalignment error requires that the grating misalignment angles α and β each be below 250 μrads if the alignment error of the diffracted light is to stay below 50 μrads as the grating is rotated to cover the whole spectral range.

By using the alignment technique of the present invention, which forces the net alignment error to zero at two points instead of one, a tolerance of the same order as 50 μrads can be held with grating misalignment angles as large as 10,000 μrads each—40 times larger than with previous techniques. The results of calculations for this case are presented in TABLE 2. Here the angle β was taken as 10,000 μrads. The alignment technique of the present invention would result in the angle α being 11,745 μrads. Of course, the value of neither angle would be known to the experimenter.

TABLE 2

| Wavelength (μm) | Diffracted Light Misalignment | | |
|---|---|---|---|
| | α (μrads) | β (μrads) | Error (μrads) |
| 9.11 | 11,745 | 10,000 | −57 |
| 9.24 | 11,745 | 10,000 | −36 |
| 9.37 | 11,745 | 10,000 | −17 |
| 9.49 | 11,745 | 10,000 | 0 |
| 9.62 | 11,745 | 10,000 | 14 |
| 9.75 | 11,745 | 10,000 | 25 |
| 9.87 | 11,745 | 10,000 | 34 |
| 10.00 | 11,745 | 10,000 | 39 |
| 10.12 | 11,745 | 10,000 | 41 |
| 10.25 | 11,745 | 10,000 | 40 |
| 10.38 | 11,745 | 10,000 | 36 |
| 10.50 | 11,745 | 10,000 | 28 |
| 10.63 | 11,745 | 10,000 | 16 |
| 10.76 | 11,745 | 10,000 | 0 |
| 10.88 | 11,745 | 10,000 | −20 |

As a further check on the power of this technique, calculations were done for the situation in which the rotation axis bearing has significant runout, causing a systematic deviation in the axis direction as the diffraction grating is rotated. This situation was modeled as a linear change in the angle β from −1000 μrads at one end of the spectral range to +1000 μrads at the other end of the spectrum. This amount of bearing wobble would, using previous methods, normally cause a diffracted light error of 150 μrads. By adjusting the other alignment angle α according to the method of the present invention, the alignment error of the diffracted light due to the systematic deviation can be eliminated over the whole desired spectral range.

TABLE 3

| Wavelength (μm) | Diffracted Light Misalignment with Bearing Runout | | |
|---|---|---|---|
| | α (μrads) | β (μrads) | Error (μrads) |
| 9.11 | 1,007 | −1,000 | −56 |
| 9.24 | 1,007 | −857 | −35 |
| 9.37 | 1,007 | −714 | −16 |
| 9.49 | 1,007 | −517 | 0 |
| 9.62 | 1,007 | −429 | 14 |
| 9.75 | 1,007 | −286 | 25 |
| 9.87 | 1,007 | −143 | 33 |
| 10.00 | 1,007 | 0 | 38 |
| 10.12 | 1,007 | 143 | 40 |
| 10.25 | 1,007 | 286 | 39 |
| 10.38 | 1,007 | 429 | 35 |
| 10.50 | 1,007 | 571 | 27 |
| 10.63 | 1,007 | 714 | 15 |
| 10.76 | 1,007 | 857 | 0 |
| 10.88 | 1,007 | 1,000 | −20 |

The method of the present invention was tested in the laboratory by putting a $CO_2$ laser diffraction grating mount mechanism under an interferometer and illuminating it with a HeNe laser and carrying out the procedure described above. The misalignment angle ε was measured in scanning from the 13th to the 16th orders as shown in FIG. 5. The curve fitted to the data points required parameter values of 3200 μrads for the angle α and 2942 μrads for the angle β. The data agrees well with theory for a choice of tilt angle β equal to 2942 μrads, thus indicating that over the range of rotation angle θ corresponding to the 9.2 to 10.8 micron wavelength region of the $CO_2$ laser the total misalignment is about 60 μrads. (The point corresponding to the 17th order was not sufficiently visible to be measured for the grating under test because of the particular blaze angle it had.)

Although the present invention has been described in detail with reference to a particular preferred embodiment, persons possessing ordinary skill in the art to which this invention pertains will appreciate that various modifications may be made without departing from the spirit and scope of the invention.

What is claimed is:

1. a method of aligning a reflecting element which is part of an optical apparatus so that said reflecting element remains in alignment over a substantial range of rotation about a rotational axis specified by an orientation angle θ, including the steps of:
   (a) aligning said optical apparatus at a first reference position near a first end of said substantial range of rotation, corresponding to an orientation angle $\theta_0$, using a solid-body alignment adjustment of said reflecting element of said optical apparatus;
   (b) rotating said reflecting element to a second reference position near a second end of said substantial range of rotation, corresponding to an orientation angle $\theta_1$;

(c) realigning said optical apparatus by adjusting said apparatus to vary the value of an angle $\alpha$ to reduce misalignment where the angle $\alpha$ is the axial misalignment between an axis coextensive with a reflecting surface of the reflecting element and the rotational axis;

(d) rotating said reflecting element through angle $\theta$ back to said first reference position and again using said solid-body alignment adjustment of said reflecting element of said optical apparatus to realign said optical apparatus;

(e) readjusting said apparatus to further vary the angle $\alpha$ to further reduce remaining misalignment of said optical apparatus; and (f) repeating steps (b) through (e) until said optical apparatus is aligned at both said reference position corresponding to said angular orientations $\theta_0$ and $\theta_1$.

2. The method recited in claim 1 in which said reflecting element is a diffraction grating.

3. The method recited in claim 2 in which said optical apparatus is a laser optical resonator cavity.

4. The method recited in claim 2 in which said optical apparatus is a laser optical resonator cavity, and said diffraction grating is used to tune a wavelength of radiation emanating from said laser optical resonator cavity.

5. A method of aligning a reflecting element which is part of an optical apparatus so that said reflecting element remains in alignment over a substantial range of rotation about a rotational axis specified by an orientation angle $\theta$, including the steps of:

(a) aligning said optical apparatus at a first reference position near a first end of said substantial range of rotation, corresponding to an orientation angle $\theta_0$, using a solid-body alignment adjustment of said reflecting element of said optical apparatus;

(b) rotating said reflection element to a second reference position near a second end of said substantial range of rotation corresponding to an orientation angle $\theta_1$;

(c) realigning said optical apparatus by adjusting said apparatus to vary the value of an angle $\beta$ to reduce misalignment, where the angle $\beta$ is the planar misalignment between a reflecting surface of the reflecting element and the rotational axis;

(d) rotating said reflecting element through angle $\theta$ back to said first reference position and again using said solid-body alignment adjustment of said reflecting element of said optical apparatus to realign said optical apparatus;

(e) readjusting said apparatus to further vary the angle $\beta$ to further reduce remaining misalignment of said optical apparatus; and (f) repeating steps (b) through (e) until said optical apparatus is aligned at both said reference position angles corresponding to said angular orientations $\theta_0$ and $\theta_1$.

6. The method recited in claim 5 in which said reflecting element is a diffraction grating.

7. The method recited in claim 6 in which said optical apparatus is a laser optical resonator cavity.

8. The method recited in claim 6 in which said optical apparatus is a laser optical resonator cavity, and said diffraction grating is used to tune a wavelength of radiation emanating from said laser optical resonator cavity.

9. Apparatus for aligning a reflecting element such that the reflecting element remains in an optically aligned condition over a range of rotation about a rotational angle theta, comprising:

interferometer means having an output reference plane and an optical output passing through said reference plane, said optical output defining an optical axis;

means for mounting a reflecting element such that said reflecting element is substantially perpendicular to said optical axis, said mounting means being operable for rotating said reflecting element over a rotational angle theta about a rotational axis;

means for translating said mounting means relative to said interferometer means for accomplishing a solid-body orientation of said reflecting element relative to said output reference plane;

means for adjusting an angular position of said reflecting element to vary an angle alpha, where alpha is an axial misalignment between an axis coextensive with a reflecting surface of said reflecting element and the rotational axis; and means for displaying a difference between a phase of said optical output and a phase of a portion of said optical output which is reflected from said reflecting surface along said optical axis and back through said reference plane.

10. Apparatus as defined in claim 9 wherein said reflecting element is a diffraction grating.

11. Apparatus as defined in claim 10 wherein said interferometer means optical output comprises a plurality of wavelengths.

12. Apparatus as defined in claim 11 wherein said plurality of wavelengths correspond to wavelengths associated with $CO_2$ laser radiation.

13. Apparatus as defined in claim 11 wherein said plurality of wavelengths are within a range of wavelengths of approximately 9.2 to approximately 10.8 microns.

14. Apparatus as defined in claim 9 wherein said means for adjusting further comprises means for locking said reflecting element at a desired angle alpha.

15. Apparatus for aligning a reflecting element such that the reflecting element remains in an optically aligned condition over a range of rotation about a rotational angle theta, comprising:

interferometer means having an output reference plane and an optical output passing through said reference plane, said optical output defining an optical axis;

means for mounting a reflecting element such that said reflecting element is substantially perpendicular to said optical axis, said mounting means being operable for rotating said reflecting element over a rotational angle theta about a rotational axis;

means for translating said mounting means relative to said interferometer means for accomplishing a solid-body orientation of said reflecting element relative to said output reference plane;

means for adjusting an angular position of said reflecting element to vary an angle beta, where beta is a planar misalignment of a reflecting surface of said reflecting element and the rotational axis; and means for displaying a difference between a phase of said optical output and a phase of a portion of said optical output which is reflected from said reflecting surface along said optical axis and back through said reference plane.

16. Apparatus as defined in claim 15 wherein said reflecting element is a diffraction grating.

17. Apparatus as defined in claim 16 wherein said interferometer means optical output comprises a plurality of wavelengths.

18. Apparatus as defined in claim 17 wherein said plurality of wavelengths correspond to wavelengths associated with $CO_2$ laser radiation.

19. Apparatus as defined in claim 17 wherein said plurality of wavelengths are within a range of wavelengths of approximately 9.2 to approximately 10.8 microns.

20. Apparatus as defined in claim 15 wherein said means for adjusting further comprises means for locking said reflecting element at a desired angle beta.

* * * * *